(12) United States Patent
Meiners et al.

(10) Patent No.: US 9,380,260 B2
(45) Date of Patent: Jun. 28, 2016

(54) MULTICHANNEL VIDEO PORT INTERFACE USING NO EXTERNAL MEMORY

(75) Inventors: Jason Meiners, Richardson, TX (US); James Nave, Denton, TX (US); Xiaodong Wu, Frisco, TX (US); Hyunkeun Kim, Allen, TX (US); Todd Hiers, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1015 days.

(21) Appl. No.: 12/691,441

(22) Filed: Jan. 21, 2010

(65) Prior Publication Data

US 2010/0188569 A1 Jul. 29, 2010

Related U.S. Application Data

(60) Provisional application No. 61/146,096, filed on Jan. 21, 2009.

(51) Int. Cl.
| | |
|---|---|
| *H04N 7/08* | (2006.01) |
| *H04N 21/234* | (2011.01) |
| *H04N 21/2365* | (2011.01) |
| *H04N 21/434* | (2011.01) |
| *H04N 21/44* | (2011.01) |
| *H04N 7/015* | (2006.01) |

(52) U.S. Cl.
CPC ............ *H04N 7/0806* (2013.01); *H04N 21/234* (2013.01); *H04N 21/2365* (2013.01); *H04N 21/4347* (2013.01); *H04N 21/44* (2013.01); *H04N 7/015* (2013.01)

(58) Field of Classification Search
CPC ............ H04N 21/234; H04N 21/2365; H04N 21/4347; H04N 21/44; H04N 7/0806; H04N 7/015

See application file for complete search history.

(56) References Cited

U.S. PATENT DOCUMENTS

| | | | | | |
|---|---|---|---|---|---|
| 4,947,257 | A  * | 8/1990 | Fernandez et al. | ............ | 348/585 |
| 6,774,952 | B1 * | 8/2004 | Ratcliffe | ........................ | 348/581 |
| 6,888,840 | B1 * | 5/2005 | Ramaswamy et al. | ........ | 370/412 |
| 7,388,618 | B2 * | 6/2008 | Tardif | ........................... | 348/515 |
| 8,443,413 | B2 * | 5/2013 | Hiers | ............... | H04N 21/23406 |
| | | | | | 725/119 |
| 2004/0075741 | A1 * | 4/2004 | Berkey | ............. | G08B 13/19636 |
| | | | | | 348/159 |
| 2004/0218830 | A1 * | 11/2004 | Kang | ........................ | G06T 5/50 |
| | | | | | 382/274 |
| 2007/0217682 | A1 * | 9/2007 | Motomura | ........... | G06K 9/4661 |
| | | | | | 382/190 |
| 2008/0060034 | A1 * | 3/2008 | Egnal et al. | .................... | 725/105 |
| 2008/0143659 | A1 * | 6/2008 | Ma | .................. | 345/87 |

FOREIGN PATENT DOCUMENTS

| | | | | |
|---|---|---|---|---|
| EP | 263795 | A2 * | 4/1988 | |
| EP | 673575 | B1 * | 1/1999 | |
| GB | EP 1098531 | A2 * | 5/2001 | ........... H04N 21/235 |

\* cited by examiner

*Primary Examiner* — Behrooz Senfi
*Assistant Examiner* — Maria Vazquez Colon
(74) *Attorney, Agent, or Firm* — Robert D. Marshall, Jr.; Frank D. Cimino

(57) ABSTRACT

This invention is a video line encapsulation protocol which allows multiple low definition video streams to be combined into a single super frame of high definition video data. Each super frame is formed of individual lines from plural lower definition video input signals. The high definition video frames include meta data in each line identifying the video input source, line and frame. This meta data enables the super frames to be separated into their component input signals within a video processing digital signal processor.

9 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

| | 731 | 732 | 733 | 735 | 735 |
|---|---|---|---|---|---|
| 701 | EAV | N clocks | SAV | Meta Data | Dummy Line |
| 702 | EAV | N clocks | SAV | Meta Data | Dummy Line |
| 703 | EAV | N clocks | SAV | Meta Data | Active Video |
| 704 | EAV | N clocks | SAV | Meta Data | Active Video |
| 705 | EAV | N clocks | SAV | Meta Data | Dummy Line |
| ... | | | | | |
| 715 | EAV | N clocks | SAV | Meta Data | Active Video |
| 716 | EAV | N clocks | SAV | Meta Data | Dummy Line |
| ... | | | | | |
| 729 | EAV | N clocks | SAV | Meta Data | Active Video |

MULTICHANNEL VIDEO PORT INTERFACE USING NO EXTERNAL MEMORY

CLAIM OF PRIORITY

This application claims priority under 35 U.S.C. 119(e)(1) to U.S. Provisional Application No. 61/146,096 filed Jan. 21, 2009.

TECHNICAL FIELD OF THE INVENTION

The technical field of this invention is video data multiplexing and demultiplexing.

BACKGROUND OF THE INVENTION

Powerful video digital signal processors (DSPs) such as the Texas Instruments TMS320C6000 family are often used in High Definition (HD) video systems. A single DSP processes a high resolution, high quality video image. Processors of this type have the capability to process multiple video streams of a lower resolution or quality. However, DSPs of this type often lack sufficient input/output resources input and output multiple data streams. It is typical for DSPs of this type to include one or a few HD video inputs and outputs.

SUMMARY OF THE INVENTION

This invention overcomes the IO limitations of powerful DSPs directed to HD video processing to allow multiple channels of video data to be received by a processor on just one digital video port. This invention is a video line encapsulation protocol which allows multiple low definition video streams to be combined into a single super frame of high definition video data. This super frame follows the standard Comite Consultatif International Des Radiocommunications (International Radio Consultative Committee) (CCIR) 656 definition BT.1120/BT.656. This super frame be directly stored to DSP memory using a single standard video input port. The super frame can then be easily demultiplexed by the DSP direct memory access (DMA) engine with low million instructions per second (MIPS) overhead. Since this method multiplexes the video streams at an input video line rate, this method required no external frame memory. This feature lowers system cost.

BRIEF DESCRIPTION OF THE DRAWINGS

These and other aspects of this invention are illustrated in the drawings, in which:

FIGS. 8a and 8b illustrate a prior art technique used by the video processor of FIG. 5 to store incoming HD video data in memory.

DETAILED DESCRIPTION OF PREFERRED EMBODIMENTS

A preferred embodiment of this invention will be described in this section. This invention is not limited to the preferred embodiment. It would be a straight forward task for one skilled in the art to apply the invention to a larger class of data processing architectures that employ plural instruction fetch packets. This description corresponds to the Texas Instruments TMS320C6400 digital signal processor.

Figure 1:
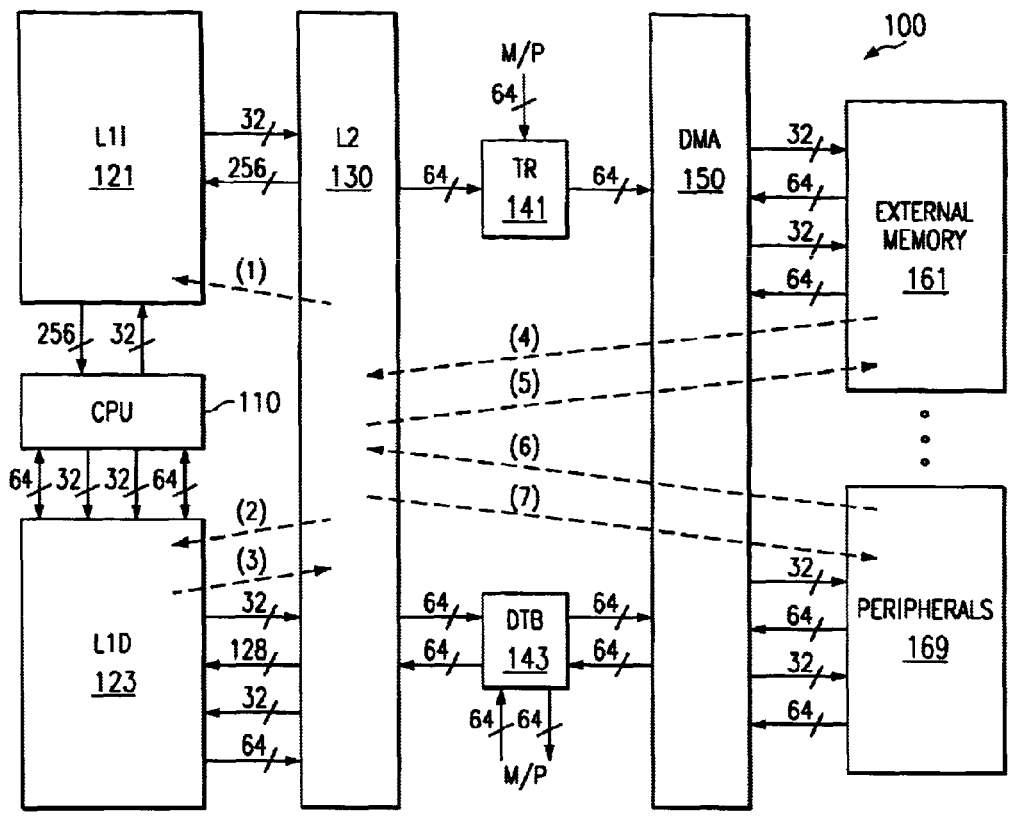
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
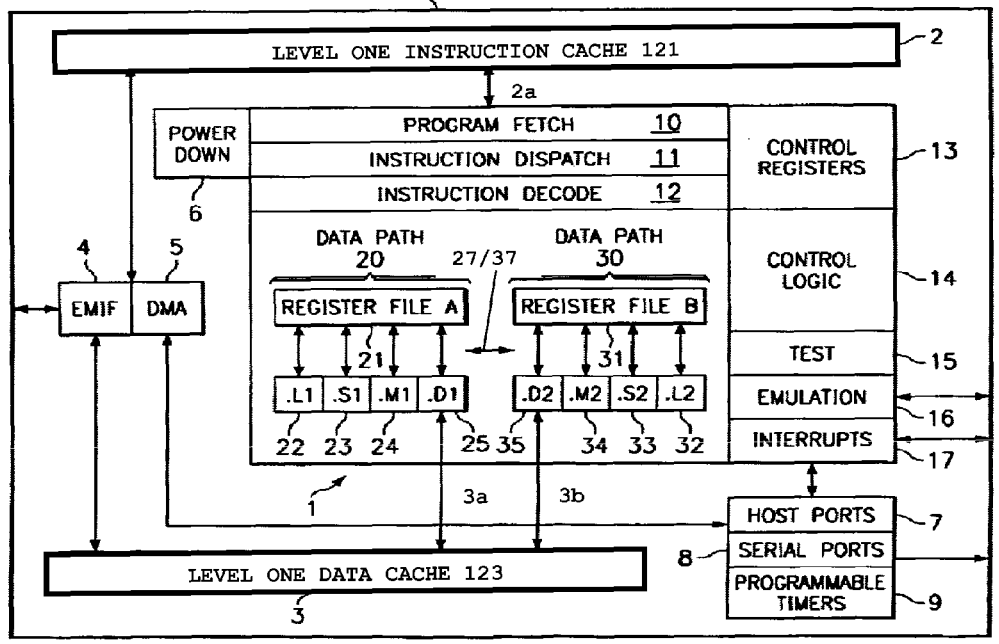
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5.

External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
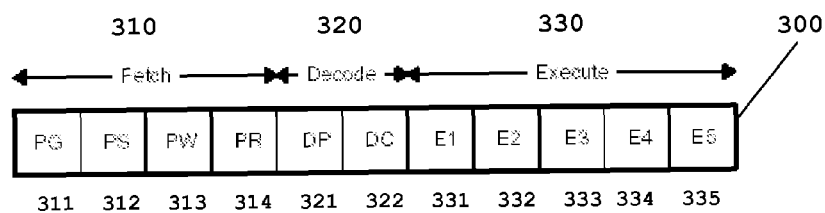
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E2) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

Figure 4:
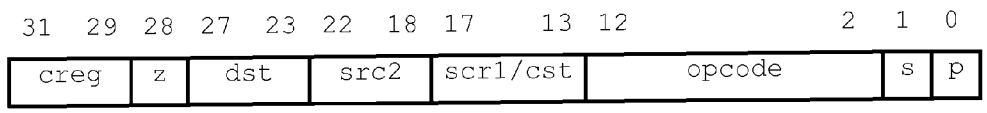
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
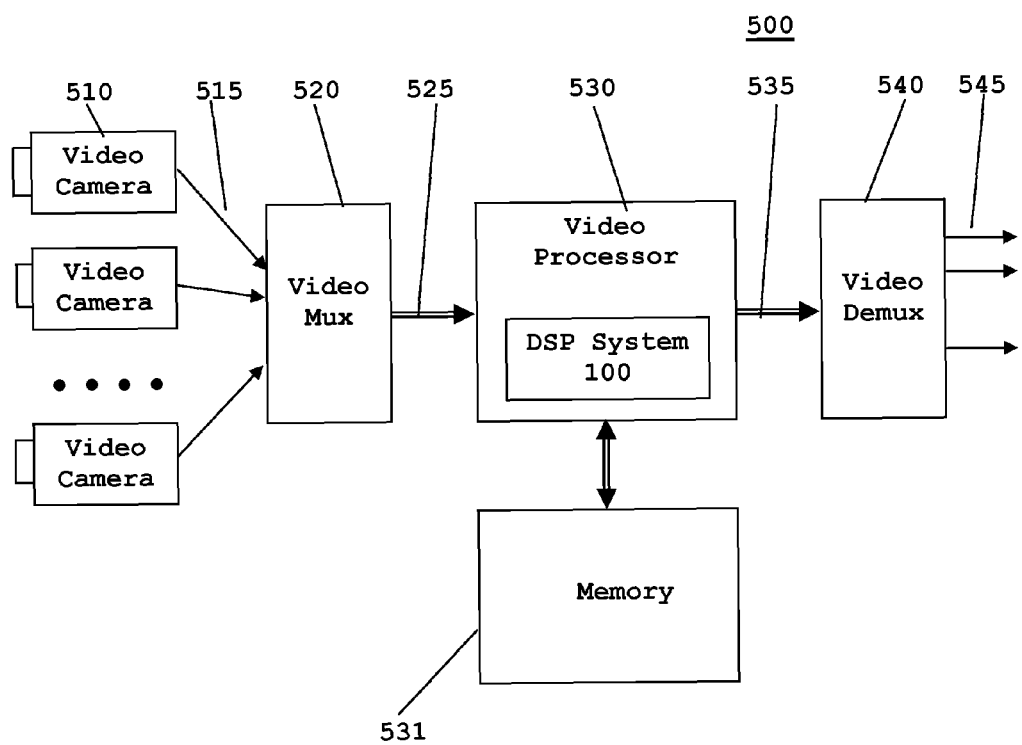
FIG. 5 illustrates an example video security system using this invention.

FIG. 5 illustrates an example video security system using this invention. Plural security cameras 510 each generate a low definition signal 515 supplied to video multiplexer 520. Video multiplexer 520 combines the plural video signals into a single HD video signals 525 supplied to video processor 530. Video processor 530 performs data processing operations on the plural video signals captured by video cameras 510. These data processing operations may make use of memory 531. Video processor 530 outputs the processed plural video signals in a HD video format at 535. Video demultiplexer 540 separates out the embedded video signals 545 for further use.

Video processor 530 includes one or more DSP systems 100 such as previously described in conjunction with FIGS. 1 to 4 plus assorted peripherals (not shown). Video processor 530 in this example includes HD video inputs and outputs. Video processor 530 with one or more embedded DSP systems 100 has the data processing capacity to handle data processing for plural low definition video signals. However, video processor 530 does not include suitable, plural video inputs or outputs for low definition video signals. This invention is a manner of multiplexing and demultiplexing plural low definition video signals to used the HD video inputs and outputs of video processor 530.

Figure 6:
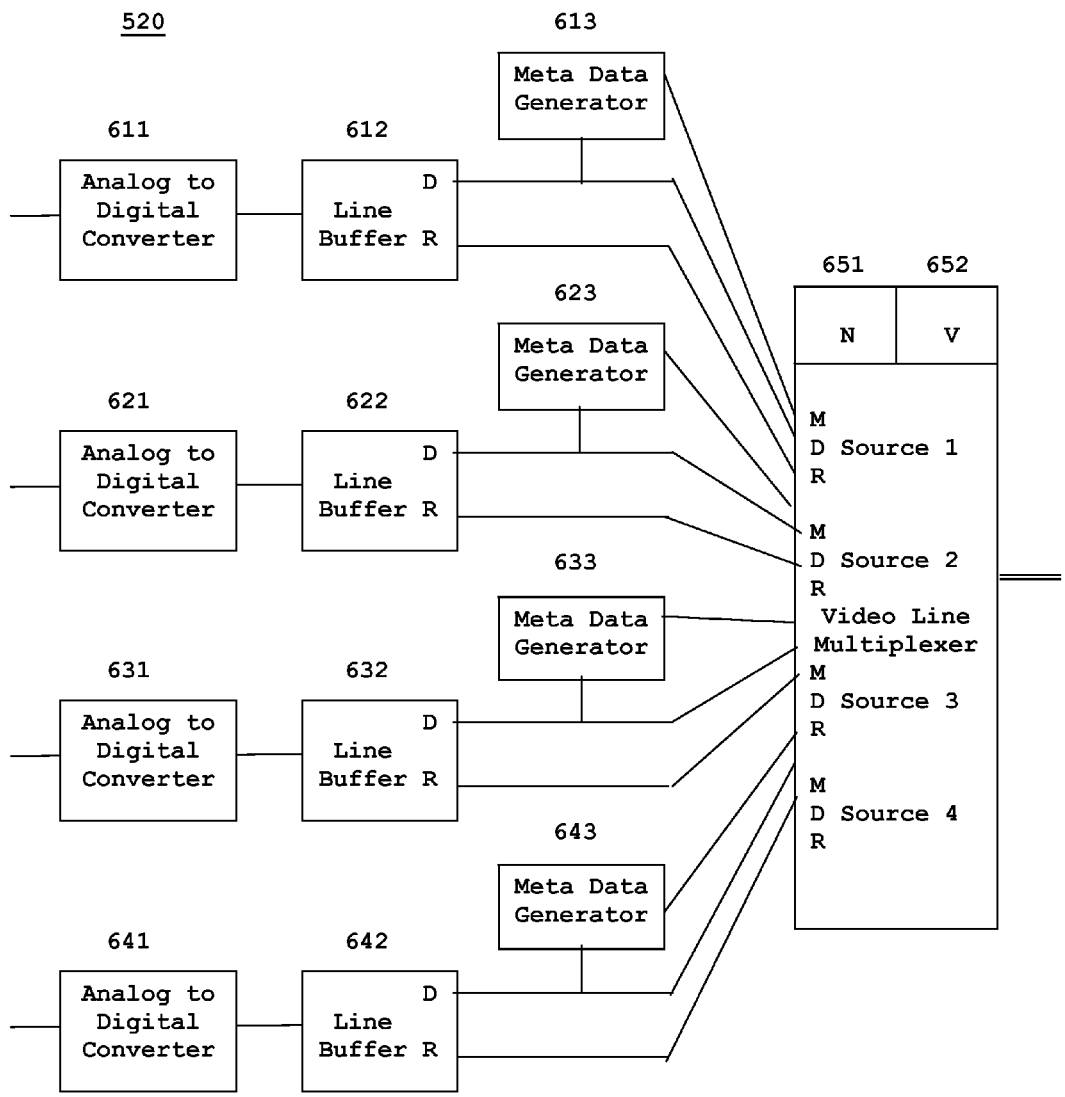
FIG. 6 illustrates an example of the internal circuits of video multiplexer of FIG. 5.

FIG. 6 illustrates an example of the internal circuits of video multiplexer 520. Video multiplexer 520 includes analog to digital converters 611, 621, 631 and 641. In this example the video sources supplied to video multiplexer 520 are asynchronous analog video security cameras. The analog video from each camera drives a corresponding analog to digital converters 611, 621, 631 or 641. FIG. 6 illustrates four analog to digital converters 611, 621, 631 and 641 but there could be more or fewer. Each analog to digital converter 611, 621, 631 and 641 converts the input analog video signal into lines of digital pixels, each pixel corresponding to a particular location in a resulting video frame. Each analog to digital converter 611, 621, 631 and 641 supplies a corresponding line buffer 612, 622, 632 and 642.

Each line buffer 612, 622, 632 and 642 temporary stores the digital data. Each line buffer 612, 622, 632 and 642 stores data at a rate set by the corresponding incoming video signal. Each line buffer 612, 622, 632 and 642 produces two outputs. The first output data D is recalled digital pixel data supplied in the order received. The second output ready R indicates when the line buffer stored enough data to be recalled. As will be further detailed below each line buffer 612, 622, 632 and 642 recalls data at a faster rate than the rate of storing. The ready signal indicates when enough data is stored in the line buffer to ensure that a whole line can be recalled at the higher data rate of the super frame. Any attempt to recall data before the line buffer is ready would result in an underflow, data would not be stored in time to be recalled at the faster rate. The ready signal prevents video line multiplexer 650 from attempting to read from a line buffer that is not ready. To accommodate delays in selecting and dispatching data from line buffers 612, 622, 632 and 634 these line buffers may need to store more than one line of the corresponding video source.

Each channel includes a corresponding meta data generator 613, 623, 633 or 643. Each meta data generator 613, 623, 633 or 643 produces meta data identifying the corresponding video line. This meta data preferably includes three parts. The first part of the meta data identifies the video source. In the preferred embodiment each meta data generator 613, 623, 633 and 643 generates a fixed number. In the embodiment illustrated in FIG. 6 a two-bit number completely identified the video source. The second part of the meta data identifies the video line within a frame. As known in the art identifying the line specifies the vertical position of the line data within a frame. The field corresponding to the video line must have a size at least as large as $\log_2(L)$, where L is the number of lines per frame. The third part of the meta data is a frame number. This frame number may be used to distinguish odd and even frames in interlace video and for recovery from video signal interruption or noise. The number of bits devoted to the frame number should be sufficient to distinguish between frames in the event of an interruption. Note that this frame number may be necessary because a source video frame may be split between two output HD video frames.

Video line multiplexer 650 assembles the HD video supplied to video processor 530. Register 651 stores N which is the number of pixels in the horizontal blanking interval. Register 652 stores V which is the number vertical lines in the output HD video frame. These registers are preferably writable to accommodate different configurations. Register 651 is preferably programmable in the range from 4 to 128.

Figure 7:
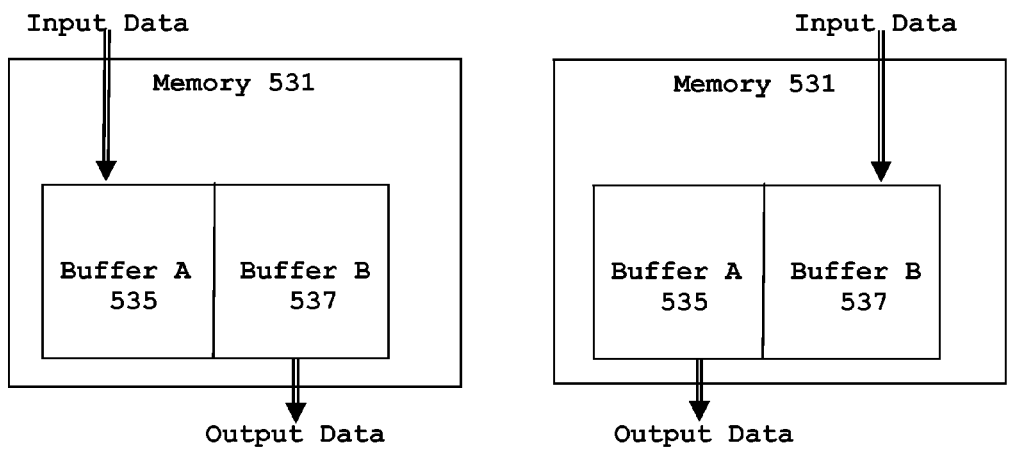
FIG. 7 illustrates an example super frame as assembled in video line multiplexer of FIG. 6.

Video line multiplexer 650 determines the line buffer 612, 622, 632 or 642 that first signaled data ready. A next video line in the super frame includes: an end of active video (EAV) signal; a horizontal blanking interval of N clock signals (pixels); a start of active video (SAV) signal; the meta data from the corresponding meta data generator 613, 623, 633 or 643; and active video data from the selected source. The line length of each line in the super frame equals: the length of an EAV signal; N pixels of horizontal blanking set by the data stored in register 651; the length of a SAV signal; the length of the corresponding meta data; and the length of an active video line. Each succeeding line is formed in the same manner. If at any super frame line start time no line buffer 612, 622, 632 or 642 generates a data ready signal, then video line multiplexer 650 generates a line with dummy data instead of active video (as shown in FIG. 7). When the number of lines equals V stored in register 652, video line multiplexer 650 begins a new frame. Video line multiplexer 650 makes no attempt to align input video frames with output super frames but operates on input video lines only.

FIG. 7 illustrates an example super frame as assembled in video line multiplexer 650. Each super frame line begins with two vertical blanking dummy lines 701 and 702 containing no data. Such dummy lines may have the same form as active video lines described below. The third line 703 is the first active video line. Line 703 includes EAV signal 731, a horizontal blanking interval 732 of N clock cycles, a SAV signal 733, meta data 734 and active video 735. Line 705 illustrates a dummy line as described above. The super frame of this example continues through active line 715, dummy line 716 and ends with active line 729. A new frame begins following active line 729. As previously described the number of lines in the super frame is set by the number stored in register 652.

FIGS. 8a and 8b illustrate a prior art technique used by video processor 530 to store incoming HD video data in memory 531. Memory 531 includes two input buffers, buffer A 535 and buffer B 537. Each of input buffer A 535 and buffer B 537 are large enough to store a super frame. Video processor 530 operates these two buffers in what is known as a ping-pong fashion. FIG. 8a illustrates operation during input of a first super frame. Video processor 530 directs the input HD video frame data to buffer A 535. This input process preferably includes proper programming DMA 5 of one of DSP cores 200 for data transfer from the input port to the assigned locations within buffer A 535. FIG. 8a also illustrates during this time that data is output from buffer B 537. This output process may be passing the data to one of digital signal processor system 100 for data processing or transfer to another portion of memory for further temporary storage. This output process preferably includes proper programming DMA 5 of one of DSP cores 200 for data transfer from buffer B 537 to the destination of this data. FIG. 8b illustrates operation during input of a second super frame. Video processor 530 directs the input HD video frame data to buffer B 537. FIG. 8a also output of data from buffer A 535. This process uses two buffers to limit address contention of the data input and output processes.

Figure 9:
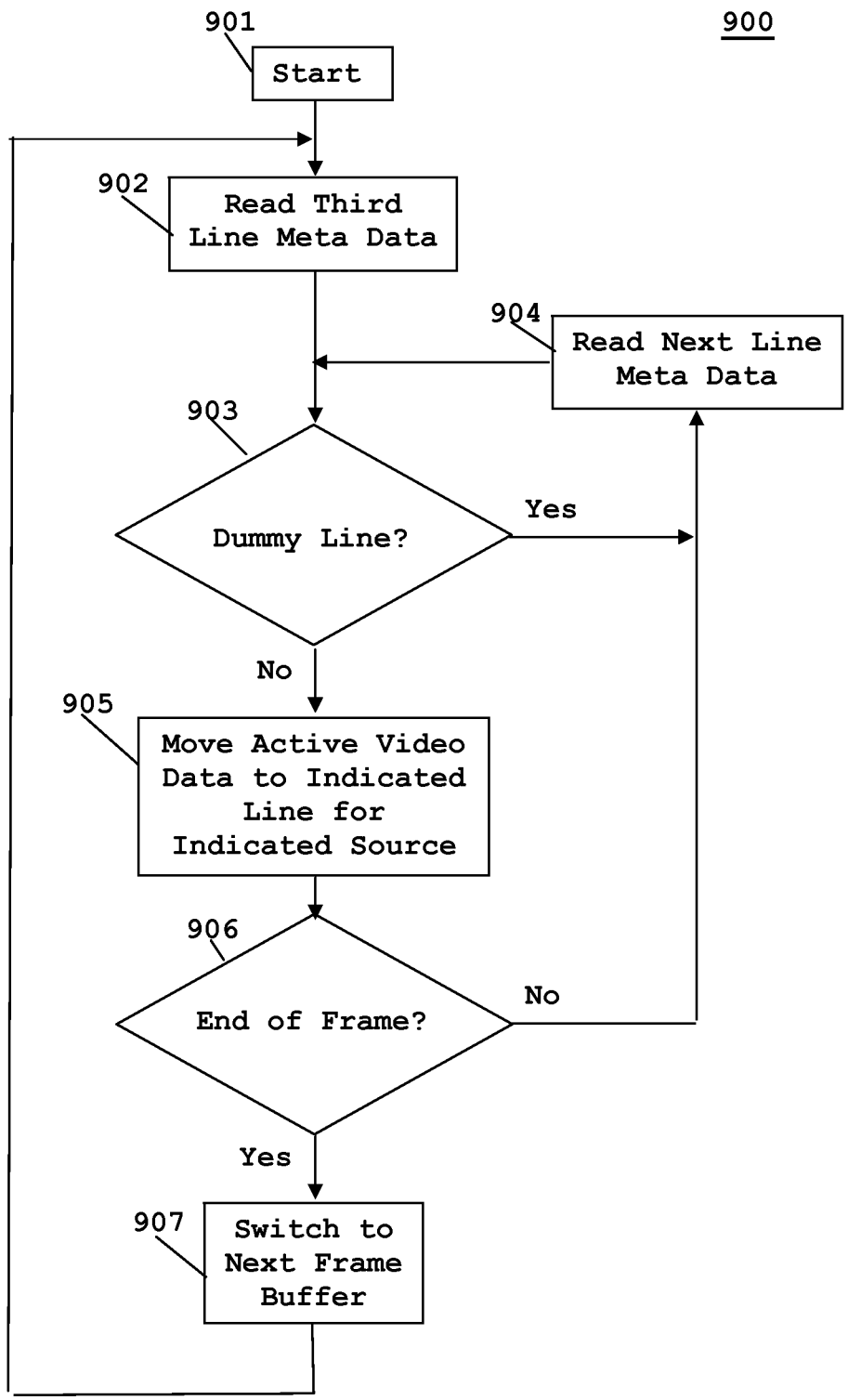
FIG. 9 is a flow chart of a process within the video processor of FIG. 5 separating original frame data of the plural video sources from the super frame data previously described.

FIG. 9 is a flow chart of a process within video processor 530 separating original frame data of the plural video sources from the super frame data previously described. Process 900 takes super frame data such as stored in buffer A 535 or buffer B 537 and moves it to a frame buffer assigned to the plural video sources. Not shown in FIG. 9 but assumed is the provision of a frame buffer for each original video source.

Process 900 begins with start block 901 at the consideration of a new super frame. Block 902 reads the meta data associated with the third line 703 of the super frame. As previously describe in conjunction with FIG. 7, the preferred super frames begin with two dummy lines 701 and 702 which do not include data from any video source. Test block 903 determines from the just read meta data whether the line is a dummy line. In the preferred embodiment video line multiplexer 650 supplies the meta data for any dummy lines including coding that indicates the video line is a dummy line. If the current line is a dummy line (Yes at test block 903), then block 904 reads the meta data for the next line. The super frames of this invention have a fixed line size, thus the location of the meta data for a next video line can be calculated from the location of the meta data of the current video line.

If the current line is not a dummy line (No at test block 903), then block 905 moves the active data of the current line to a location corresponding to the video source identity, the line identity and the frame identity. Process 900 preferably uses individual frame buffers provided for each original video stream. Process 900 may use ping-pong buffers such as illustrated in FIGS. 8a and 8b for this transfer. Assuming a fixed video format for each original input video stream the identity data in the corresponding meta data permits calculation of a memory address for storing each line of the super frame.

Test block 906 determines if the current line is the last line in the super frame. According to the preferred embodiment, the line length of the super frame is fixed. Thus determining the last line involves merely counting prior lines within the current super frame. If the current line is not the end of a frame (No at test block 906), then process 900 advances to block 904 beginning the process for a next video line. If the current line is the end of a frame (Yes at test block 906), then block 907 switches to the new super frame buffer. According to the technique illustrated in FIGS. 8a and 8b this involves switching from using buffer A 535 to using buffer B 537 as the super frame data source or vice versa. Process 900 then advances to block 902 to read the meta data for the third line of the new super frame.

This invention employs a fixed frame rate and frame size for the super frame. All video lines in this super frame have the same number of clocks and length. Thus this super frame looks just like a standard stream to the HD video input of video processor 530. There are several reasons that this technique works from a timing perspective. First, there is no relation between the output frame rate and the input frame rates. The selection of the output frame size V is arbitrary. Larger values of V will reduce the bandwidth overhead caused by the two lines of vertical blanking. The inventors believe that any value of L over about 100 will work fine. The value of V can be set based on the desired frequency of the capture frame interrupt on the DSP. Second, sending additional dummy lines will not break the system. Such dummy lines will be ignored when transferring video data to the individual video stream buffers as noted above in FIG. 9. Dummy lines do not add much bandwidth overhead because the only time they are sent is when no line buffers 612, 622, 632 and 642 are full. This is an underflow like condition. The super frame size must be selected considering the necessary line rate bandwidth. As long as the horizontal blanking interval set by N is a small (N up to 6), the output bandwidth greatly exceeds the maximum input bandwidth for each line. The worst case condition is the 2 line vertical blanking interval. The super frame size must be selected to avoid overflowing line buffers 612, 622, 632 and 642. The overhead of the dummy lines is not important since its magnitude is less than the vertical blanking case and they will never coincide.

Table 1 lists parameters for various input video stream parameters and shows this technique can meet the real time bandwidth requirements with a 4 line buffer in the video decoder. The video decoder is one of the data processing processes in video processor 530.

TABLE 1

| Channel Mux | N | Hper mS | Fill Rate pix/S | Drain Rate pix/S | Ratio | Residue | Vb line 1 |
|---|---|---|---|---|---|---|---|
| 4 | 6 | 636 | 16,500 | 18,400 | 1.11 | 1.5 | 1.724 |
| 2 | 6 | 636 | 16,500 | 18400 | 1.11 | 1.5 | 1.949 |
| 4 | 64 | 636 | 16,500 | 17000 | 1.03 | 1.5 | 1.742 |
| 2 | 64 | 636 | 16,500 | 17000 | 1.03 | 1.5 | 1.984 |
| 4 | 34 | 318 | 33,000 | 33600 | 1.02 | 1.5 | 1.746 |
| 2 | 34 | 318 | 33,000 | 33600 | 1.02 | 1.5 | 1.992 |

In Table 1: channels mux is the number of input video data streams; N is the number of clock cycles or pixels in the horizontal interval; Hper is the worst case horizontal period of the incoming video in milliseconds; Fill rate is the buffer fill rate incoming video into buffer in pixels per second; Drain rate is the buffer drain rate of video being sent out DSP video port in the super frame in pixels per second; Ratio is the ratio of the drain rate to fill rate; Residue is the maximum buffer level needed before the super frame vertical blanking interval; and Vb line 1 is the maximum buffer level AFTER the super frame vertical blanking interval (worst case buffer condition).

Ratio must be greater than 1 or the input bandwidth exceeds the output bandwidth. The LLC dev is 105%. There are 8 meta data pixels per line. This assumes 601 sampling and 720 active pixels. The fill rate is calculated as (1/Hper) *LLC div. The drain rate is (27 Mhz)/(720+code+N)*2. This represents the worst case when all video streams are fast and in active video. The preferred embodiment of the invention has 4 line buffers in the video decoder but Table 1 shows that a system with only 2 line buffers in the video coder would be operable.

What is claimed is:

1. A method for forming a super frame of high definition video from plural lower definition video input sources comprising the steps of:
   separately buffering video lines of each of said plurality of lower definition video input sources;
   forming a video line of a high definition video frame consisting of all data of a whole buffered video line of one of said plurality of lower definition video input sources recalled directly from a corresponding video line buffer each time a whole video line from said lower definition video input source is buffered including forming meta data identifying attributes of said video line of said corresponding one of said plurality of lower definition video input sources and forming said meta data within an active portion of the corresponding video line of the high definition video frame;
   beginning a new frame of the high definition video each time a predetermined number of high definition video lines are formed, said predetermined number of high definition video lines greater than a number of video lines in any of said plurality of lower definition video input sources.

2. The method of claim 1, wherein:
said meta data of each high definition video line includes data identifying the corresponding lower definition video input source.

3. The method of claim 1, wherein:
said meta data of each high definition video line includes data identifying a video line specifying a vertical position of said lower definition video line within a video frame of the corresponding lower definition video input source.

4. The method of claim 1, wherein:
said meta data of each high definition video line includes data identifying a video frame of the corresponding lower definition video input source by a frame number.

5. A video processing system comprising:
a plurality of line buffers, each line buffer having an input receiving input data from a corresponding low definition video source, a ready output generating a ready signal when a whole video source line is stored and an output recalling data stored therein at a higher rate than input by said video source;
a video line multiplexer having plural inputs, each input connected to said ready output and said output of a corresponding one of said plurality of line buffers, said video line multiplexer
   forming a line of high definition video having a greater line rate than any low definition video source consisting of all data of a whole video line recalled directly from one of the plurality of line buffers which first generated a ready signal, said video line multiplexer having a high definition video output of said video lines of high definition video including forming said meta data corresponding to said low definition video line within the corresponding video line of the high definition video frame,
   forming a frame of high definition video each time a predetermined number of high definition video lines are formed, said predetermined number of high definition video lines greater than a number of video lines in any of said plurality of lower definition video input sources;
a plurality meta data generators, each connected to a corresponding line buffer and to a corresponding input of said video line multiplexer, each forming meta data identifying attributes of said corresponding low definition video input source;
a video processor connected to said high definition video output of said video line multiplexer, said video processor performing data processing operations on said plural video sources independently.

6. The video processing system of claim 5, wherein:
said video line multiplexer includes a horizontal blanking register indicating a predetermined length of a horizontal blanking interval.

7. The video processing system of claim 5, wherein:
each of said meta data generators forms meta data of each high definition video line identifying the video input source.

8. The video processing system of claim 5, wherein:
each of said meta data generators forms meta data of each high definition video line identifying a video line specifying a vertical position of said lower definition video line within a video frame of the corresponding lower definition video input source.

9. The video processing system of claim 5, wherein:
each of said meta data generators forms meta data of each high definition video line identifying a video frame of the corresponding lower definition video input source by a frame number.

\* \* \* \* \*